(12) United States Patent
Toba et al.

(10) Patent No.: US 9,160,959 B2
(45) Date of Patent: Oct. 13, 2015

(54) TRANSMISSION DEVICE, TRANSMISSION METHOD, RECEPTION DEVICE, RECEPTION METHOD, AND TRANSMISSION/RECEPTION SYSTEM

(75) Inventors: Kazuaki Toba, Kanagawa (JP); Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/342,649

(22) PCT Filed: Sep. 6, 2012

(86) PCT No.: PCT/JP2012/072825
§ 371 (c)(1),
(2), (4) Date: Mar. 4, 2014

(87) PCT Pub. No.: WO2013/047150
PCT Pub. Date: Apr. 4, 2013

(65) Prior Publication Data
US 2014/0218616 A1    Aug. 7, 2014

(30) Foreign Application Priority Data
Sep. 28, 2011   (JP) .................................. 2011-213549

(51) Int. Cl.
*H04N 21/43* (2011.01)
*H04N 5/38* (2006.01)
*H04N 21/4363* (2011.01)

(52) U.S. Cl.
CPC ............. *H04N 5/38* (2013.01); *H04N 21/4302* (2013.01); *H04N 21/43635* (2013.01)

(58) Field of Classification Search
CPC  H04N 21/4302; H04N 5/38; H04N 21/43635
See application file for complete search history.

(56) References Cited

U.S. PATENT DOCUMENTS

| 7,742,438 B1 * | 6/2010 | Xu et al. ..................... 370/278 |
| 2010/0085482 A1 * | 4/2010 | Toba et al. .................... 348/554 |
| 2011/0206355 A1 * | 8/2011 | Toba et al. .................... 386/355 |

FOREIGN PATENT DOCUMENTS

| JP | 62-200835 A | 9/1987 |
| JP | 2008-187586 A | 8/2008 |
| JP | 2009-038596 A | 2/2009 |
| JP | 2010-081434 A | 4/2010 |
| JP | 2011-087162 A | 4/2011 |
| JP | 2011-172156 A | 9/2011 |

* cited by examiner

Primary Examiner — Jefferey Harold
Assistant Examiner — Sean Haiem
(74) Attorney, Agent, or Firm — Sony Corporation

(57) ABSTRACT

High-quality content reproduction is to be realized. A transmission clock is supplied from a sink (repeater) device to a source device via a clock signal line. The source device sends content data to the sink (repeater) device via a predetermined number of differential signal lines in synchronization with the transmission clock supplied from the sink (repeater) device. High-quality content reproduction can be performed in the sink (repeater) device, without the use of any additional lines other than the differential signal lines and the clock signal line. For example, upon receipt of a transmission clock supply request from the source device, the sink (repeater) device supplies the transmission clock to the source device.

20 Claims, 10 Drawing Sheets

FIG. 6

HDMI PIN ASSIGNMENT (CASE OF Type-A)

| PIN | Signal Assignment |
|---|---|
| 1 | TMDS Data2+ |
| 2 | TMDS Data2 Shield |
| 3 | TMDS Data2− |
| 4 | TMDS Data1+ |
| 5 | TMDS Data1 Shield |
| 6 | TMDS Data1− |
| 7 | TMDS Data0+ |
| 8 | TMDS Data0 Shield |
| 9 | TMDS Data0− |
| 10 | TMDS Clock+ |
| 11 | TMDS Clock Shield |
| 12 | TMDS Clock− |
| 13 | CEC |
| 14 | Utility/HEAC+ |
| 15 | SCL |
| 16 | SDA |
| 17 | DDC/CEC Ground /HEAC Shield |
| 18 | +5V Power |
| 19 | Hot Plug Detect/HEAC− |

TRANSMISSION DEVICE, TRANSMISSION METHOD, RECEPTION DEVICE, RECEPTION METHOD, AND TRANSMISSION/RECEPTION SYSTEM

TECHNICAL FIELD

The present technique relates to a transmission device, a transmission method, a reception device, a reception method, and a transmission/reception system, and more particularly, to a transmission device and the like that enable high-quality content reproduction on the reception side.

BACKGROUND ART

In recent years, AV (Audio/Visual) devices that involve digital signals such as audio signals and video signals have spread, and there are various kinds of interfaces suggested for transmitting digital signals between such AV devices. Those interfaces include widely-known ones compliant with the IEEE (Institute of Electrical and Electronics Engineers) 1394 standards, the HDMI (High-Definition Multimedia Interface) standards (HDMI being a registered trade name), and the like.

According to the HDMI Specification, a TMDS clock synchronized with TMDS (Transition Minimized Differential Signaling) data is normally transmitted from a source device to a sink (repeater) device, and the sink (repeater) device reproduces the TMDS data in synchronization with the TMDS clock.

A repeater device normally includes an expensive, high-performance clock source so as to realize high-quality audio reproduction. According to the above described HDMI Specification, however, a clock generated by an inexpensive clock source included in the source device needs to be used in reproduction, and reproduction using a clock generated by the high-performance clock source in the repeater device cannot be performed.

Also, in an application to generate video images by receiving digital data of video/audio content from more than one source device, clocks supplied from the respective source devices are not synchronized with one another. Also, the transmission formats are generated in the source devices, and therefore, the sink device needs to have a large-sized buffer and a format conversion function. In view of this, it is difficult to realize such an application.

FIG. 10 shows an outline of specifications according to the existing HDMI Specification. An HDMI transmitter exists in a source device, generates digital data of video/audio content to be transmitted and its reference clock, and transmits the digital data and the reference clock to an HDMI receiver in a sink (repeater) device as a connection destination through TMDS channels #0, #1, and #2, and a TMDS clock channel. The TMDS clock to be transmitted is equivalent to the pixel clock of the video content.

The relationship between a TMDS clock and a clock for audio reproduction, or a CTS (Cycle Time Stamp) and an N parameter, are transmitted as an ACR (Audio Clock Regeneration) packet independently from the source device to the sink (repeater) device. As a result, an audio clock can be generated from a TMDS clock in the sink (repeater) device.

In the above described HDMI specifications, the quality of the clock for reproduction depends on the quality of the clock source such as a crystal oscillator provided in the source device. It is well known that the quality of the clock for reproduction has a very large influence on reproduction of digital video/audio content. Particularly, in audio reproduction, the quality of content reproduction relies greatly on the quality of the clock.

Therefore, particularly in repeater devices, a high-quality clock source with a reduced jitter is often provided so as to realize high-quality audio reproduction. However, in a connection according to the HDMI Specification, high-quality reproduction using the high-quality clock source provided in a repeater device cannot be performed.

Patent Document 1 suggests a method of realizing higher-quality reproduction of audio data superimposed and transmitted in the same phase by the sink (repeater) device superimposing a clock for audio reproduction on differential transmission through an HEAC channel of an HDMI. At the same time, a clock for audio data to be transmitted from the sink (repeater) device through a TMDS channel can also be transmitted by using this suggestion.

CITATION LIST

Patent Document

Patent Document 1: Japanese Patent Application Laid-Open No. 2010-081434

SUMMARY OF THE INVENTION

Problems to be Solved by the Invention

In the case of the above described suggestion in Patent Document 1, video data to be handled based on a clock in the source device and audio data to be handled based on a clock transmitted from the sink (repeater) device need to be transmitted in an asynchronous manner. Therefore, an audio clock generated based on a TMDS clock and a CTS/N parameter is not necessarily the same as a clock actually transmitted from the sink (repeater) device.

Also, in the case of the above described suggestion in Patent Document 1, there is a risk that, when an HDMI connection is converted to another digital interface, the superiority thereof will be degraded due to the format conversion. That is, when an HDMI is bridged and is converted into another digital interface, an HEAC channel as well as the TMDS channels and the TMDS clock channel need to be managed in the case of the above described suggestion in Patent Document 1.

An application that has not been realized as shown in FIG. 11 is now discussed. This application is an application to connect four source devices 100 to one sink device 200, and display content supplied from the four source devices 100 on the one sink device 200.

To realize this application with a connection according to the existing HDMI Specification, a video format, a clock, and a parameter for an audio clock are supplied from each of the source devices to the sink device. To cope with such situations, the sink device needs to have a format converter for integrating the video formats supplied from the respective source devices, and a large-sized audio/video buffer to accommodate differences in transmission speed, and also needs to control the format converter and the buffer. It is extremely difficult to realize such a configuration.

An object of the present technique is to enable high-quality content reproduction.

Solutions to Problems

A concept of the present technique lies in a transmission device that includes:

a transmission clock receiving unit that receives a transmission clock from an external device via a clock signal line; and a data transmitting unit that transmits content data to the external device via a predetermined number of differential signal lines in synchronization with the transmission clock received by the transmission clock receiving unit.

According to the present technique, the transmission clock is received by the transmission clock receiving unit from the external device via the clock signal line. The data transmitting unit then transmits content data to the external device via the predetermined number of differential signal lines in synchronization with the received transmission clock. For example, a transmission clock (TMDS clock) is received through a TMDS clock channel, and digital audio/video content data is transmitted through three TMDS channels.

As described above, according to the present technique, the transmission clock is received from the external device via the clock signal line, and content data is transmitted to the external device in synchronization with the transmission clock. Accordingly, high-quality content reproduction can be performed in the external device, without the use of any additional line.

According to the present technique, the transmission device may further include: a function determining unit that determines whether the external device has the function of transmitting the transmission clock; and a transmission clock requesting unit that requests the external device to transmit the transmission clock when the external device is determined to have the function of transmitting the transmission clock. With this structure, a transmission process based on the transmission clock from the external device can be appropriately performed.

Also, according to the present technique, the transmission device may further include a communication unit that notifies the external device of the video format of the content, and receives a notification of a transmission video format from the external device, for example. The data transmitting unit transmits the content data in the transmission video format designated in the notification from the external device to the external device. With this structure, the load of processing such as a format conversion process on the external device can be greatly reduced, and an application to simultaneously display content supplied from more than one source device can be easily realized in the external device, for example.

Also, according to the present technique, the communication unit further notifies the external device of the audio format of the content, and further receives a notification of a parameter indicating the relationship between a transmission clock and an audio clock from the external device. The transmission device further includes an audio clock generating unit that generates an audio clock based on the transmission clock received by the transmission clock receiving unit and the parameter. In this case, a notification of the CTS/N parameter corresponding to the audio format can be received from the external device, and the audio clock corresponding to the transmission audio data can be generated and used.

Also, according to the present technique, the transmission device may further include: a clock source that obtains a system clock; a transmission clock generating unit that generates a transmission clock by demultiplying the system clock obtained by the clock source; and a transmission clock transmitting unit that transmits the transmission clock generated by the transmission clock generating unit to the external device via the clock signal line. When the transmission clock transmitting unit transmits the transmission clock to the external device, the data transmitting unit transmits the content data to the external device in synchronization with the transmitted transmission clock. When the transmission clock receiving unit receives the transmission clock from the external device, the data transmitting unit transmits the content data to the external device in synchronization with the received transmission clock. With this structure, it is possible to appropriately cope with a case where the transmission clock cannot be received from the external device.

Another concept of the present technique lies in a reception device that includes:

a data receiving unit that receives content data from an external device via a predetermined number of differential signal lines;

a data processing unit that processes the content data based on a system clock; and a transmission clock transmitting unit that transmits a transmission clock synchronized with the system clock to the external device via a clock signal line.

According to the present technique, the data receiving unit receives content data from the external device via the predetermined number of differential signal lines, and the data processing unit processes the content data based on the system clock, for example. The transmission clock transmitting unit then transmits the transmission clock synchronized with the system clock via the clock signal line. For example, when there is a transmission request for the transmission clock from the external device, the transmission clock transmitting unit transmits the transmission clock to the external device.

As described above, according to the present technique, the transmission clock synchronized with the system clock is transmitted to the external device via the clock signal line. With this structure, the content data synchronized with the transmission clock can be received from the external device. That is, high-quality content reproduction can be performed, without the use of any additional line.

According to the present technique, the reception device may further include: a clock source that obtains the system clock; and a transmission clock generating unit that generates the transmission clock by using the system clock obtained by the clock source. If the clock source is a high-performance clock source, higher-quality content reproduction can be performed.

Also, according to the present technique, the reception device may further include a transmission clock receiving unit that receives the transmission clock from another external device. The transmission clock transmitting unit then transmits the transmission clock received by the transmission clock receiving unit. With this structure, the content data synchronized with the transmission clock supplied from another external device can be received from the external device.

Also, according to the present technique, the reception device may further include a notifying unit that receives the video format of the content from the external device, and notifies the external device of a transmission video format. With this structure, the video formats of content received from more than one external device can be integrated, and an application to simultaneously display content supplied from more than one source device can be easily realized.

Also, according to the present technique, the notifying unit may further receive a notification of the audio format of the content from the external device, and further notify the external device of a parameter indicating the relationship between a transmission clock and an audio clock, the parameter being calculated based on the audio format. With this structure, the audio clock corresponding to the transmission audio data can be generated and used in the external device.

Also, according to the present technique, the reception device may further include: a transmission clock receiving unit that receives a transmission clock from the external device via the clock signal line; and a system clock generating unit that generates a system clock based on the transmission clock received by the transmission clock receiving unit. When the transmission clock receiving unit receives the transmission clock from the external device, the data processing unit performs the processing based on the system clock generated by the system clock generating unit. With this structure, it is possible to appropriately cope with a case where the transmission clock cannot be transmitted to the external device.

Effects of the Invention

According to the present technique, high-quality content reproduction can be performed in the sink (repeater) device, without the use of any additional line. Also, according to the present technique, content from more than one source device can be easily displayed simultaneously on divided screens on the sink device side.

BRIEF DESCRIPTION OF DRAWINGS

FIG. 6 is a diagram showing pin assignment of type A (Type-A) in an HDMI system.

MODES FOR CARRYING OUT THE INVENTION

Figure 1:
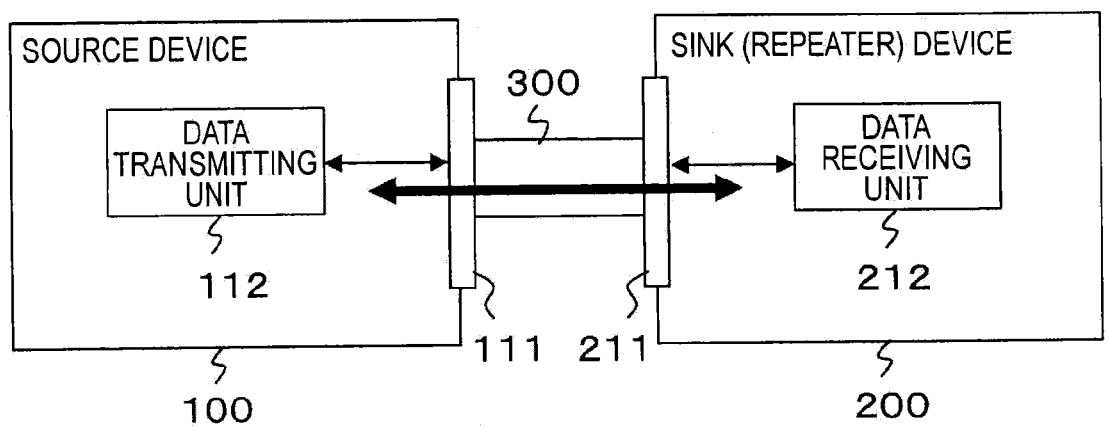
FIG. 1 is a block diagram showing an example configuration of an AV system formed with a source device and a sink (repeater) device connected to each other by a cable.

The following is a mode for carrying out the invention (hereinafter referred to as the "embodiment"). Explanation will be made in the following order.
1. Embodiment
2. Modifications 1. Embodiment Configuration of an AV System FIG. 1 shows an example configuration of an AV (Audio and Visual) system 10. This AV system 10 is formed with a source device 100 and a sink (repeater) device 200 that are connected to each other. The source device 100 is an AV source such as a game machine, a disk player, a set-top box, a digital camera, or a mobile phone. The sink (repeater) device 200 is a television receiver or a projector, for example.

The source device 100 and the sink (repeater) device 200 are connected to each other via a cable (HDMI cable) 300. The source device 100 includes a connector unit 111 having a data transmitting unit 112 connected thereto. The sink device 200 includes a connector unit 211 having a data receiving unit 212 connected thereto. One end of the cable 300 is connected to the connector unit 111 of the source device 100, and the other end of the cable 300 is connected to the connector unit 211 of the sink (repeater) device 200.

The data transmitting unit 112 of the source device 100 and the data receiving unit 212 of the sink (repeater) device 200 have structures as specified in the HDMI Specification, except that a TMDS clock can be transmitted to both devices, as will be described later.

Figure 2:
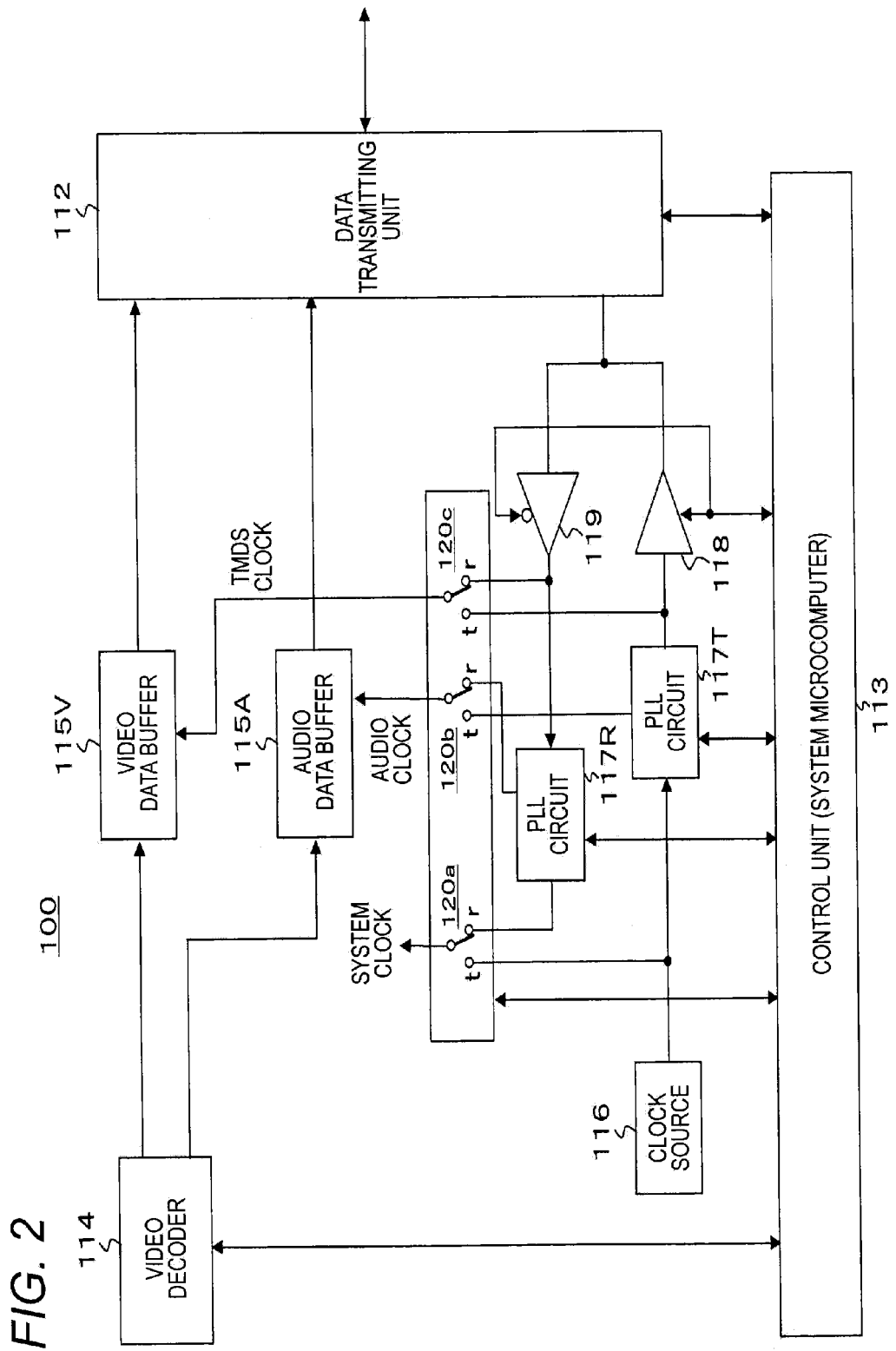
FIG. 2 is a block diagram showing a specific example structure of the source device of the AV system.

FIG. 2 shows a specific example structure of the source device 100. The source device 100 includes not only the above mentioned data transmitting unit 112 but also a control unit 113, a video decoder 114, a video data buffer 115V, and an audio data buffer 115A. The source device 100 also includes a clock source 116, PLL (Phase Locked Loop) circuits 117T and 117R, a driver 118, a receiver 119, and selector switches 120a, 120b, and 120c.

The control unit 113 controls operations of the respective components of the source device 100. The video decoder 114 outputs digital content data (video data and audio data) to be transmitted to the sink (repeater) device 200. The video data buffer 115V temporarily stores the video data output from the video decoder 114. The audio data buffer 115A temporarily stores the audio data output from the video decoder 114.

Upon receipt of a supply of a TMDS clock from the sink (repeater) device 200, the control unit 113 notifies the sink (repeater) device 200 of the video format of content through a CEC-line command communication, for example, and receives a notification of a transmission video format from the sink (repeater) device 200. In this case, the control unit 113 controls the video decoder 114 to output video data in the notified transmission video format. When the video decoder 114 is incapable of outputting video data in the notified format, the control unit 113 notifies the sink (repeater) device 200 of disapproval through a CEC-line command communication, for example, and again receives a transmission video format.

The data transmitting unit 112 has a digital interface that substantially complies with the HDMI Specification, and transmits the video data and the audio data stored in the buffers 115V and 115A to the sink device 200 via the cable 300. In this case, the reading of the video data from the video data buffer 115V is performed based on the TMDS clock, and the reading of the audio data from the audio data buffer 115A is performed based on an audio clock. The video data and the audio data are transmitted in synchronization with the TMDS clock.

The clock source 116 generates a system clock. The PLL circuit 117T demultiplies the system clock obtained from the clock source 116, to generate a TMDS clock (pixel clock) corresponding to the video format and an audio clock corresponding to the audio format. Here, the relationship between the pixel clock and the audio clock (normally 128 times shorter than sampling cycles) is indicated by a CTS/N parameter.

The driver 118 sends the TMDS clock generated by the PLL circuit 117T to the clock signal line (TMDS clock channel) of the cable 300 via the data transmitting unit 112. As described above, when a TMDS clock is applied to the sink (repeater) device 200, a CTS/N parameter in an ACR packet is sent from the source device 100 to the sink (repeater) device 200. As a result, an audio clock can be generated from a TMDS clock in the sink (repeater) device 200.

The receiver 119 receives a TMDS clock sent through the clock signal line (TMDS clock channel) of the cable 300 via the data transmitting unit 112. At this point, the control unit 113 determines whether the sink (repeater) device 200 has a function of transmitting a TMDS clock (a function of supplying a clock) based on E-EDID that is read from the sink (repeater) device 200, for example. When the sink (repeater) device 200 has a function of transmitting a TMDS clock, the control unit 113 requests the sink (repeater) device 200 to transmit a TMDS clock through a CEC-line command communication, for example.

The PLL circuit 117R demultiplies/multiplies the TMDS clock received by the receiver 119, to generate an audio clock and a system clock. In this case, the control unit 113 receives a notification of a CTS/N parameter from the sink (repeater) device 200 through a CEC-line command communication, for example, and controls the PLL circuit 117R based on the notification. The PLL circuit 117R becomes capable of generating an audio clock corresponding to the audio format based on the TMDS clock.

The selector switch 120a selectively extracts the system clock that is output from the clock source 116 or the system clock that is generated by the PLL circuit 117R, and sets the extracted system clock as the system clock to be used in the source device 100. In a case where a TMDS clock is sent from the sink (repeater) device 200, the system clock generated by the PLL circuit 117R is extracted. In any other cases, the system clock that is output from the clock source 116 is extracted.

The selector switch 120b selectively extracts the audio clock generated by the PLL circuit 117T or the audio clock generated by the PLL circuit 117R, and sets the extracted audio clock as the audio clock to be used in the source device 100. In a case where a TMDS clock is sent from the sink (repeater) device 200, the audio clock generated by the PLL circuit 117R is extracted. In any other cases, the audio clock generated by the PLL circuit 117T is extracted.

The selector switch 120c selectively extracts the TMDS clock generated by the PLL circuit 117T or the TMDS clock received by the receiver 119, and sets the extracted TMDS clock as the TMDS clock to be used in the source device 100. In a case where a TMDS clock is sent from the sink (repeater) device 200, the TMDS clock received by the receiver 119 is extracted. In any other cases, the TMDS clock generated by the PLL circuit 117T is extracted.

Figure 3:
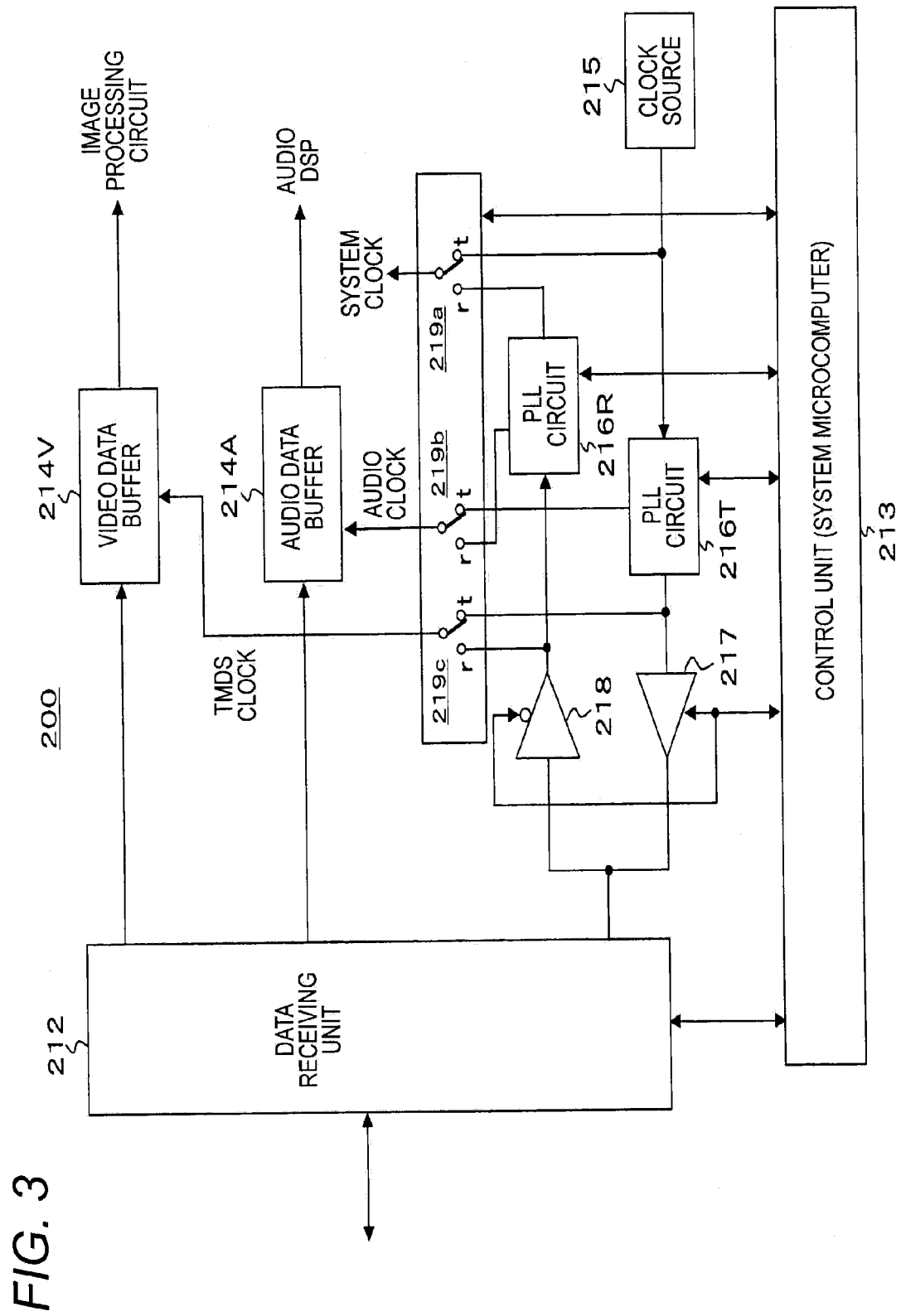
FIG. 3 is a block diagram showing a specific example structure of the sink (repeater) device of the AV system.

FIG. 3 shows a specific example structure of the sink (repeater) device 200. The sink (repeater) device 200 includes not only the above mentioned data receiving unit 212 but also a control unit 213, a video data buffer 214V, and an audio data buffer 214A. The sink (repeater) device 200 also includes a clock source 215, PLL (Phase Locked Loop) circuits 216T and 216R, a driver 217, a receiver 218, and selector switches 219a, 219b, and 219c.

The control unit 213 controls operations of the respective components of the sink (repeater) device. The data receiving unit 212 receives video data and audio data from the source device 110 via the HDMI cable 300. The video data buffer 214V temporarily stores the video data received by the data receiving unit 212. The audio data buffer 214A temporarily stores the audio data received by the data receiving unit 212.

When a TMDS clock is to be supplied to the source device 100, the control unit 213 receives a notification of the video format of content from the source device 100 through a CEC-line command communication, and notifies the source device 100 of the transmission video format determined by referring to the video format notification. Accordingly, the format of the video data received by the data receiving unit 212 is the same as the transmission video format of which the source device 100 is notified.

The clock source 215 generates a system clock. The PLL circuit 216T demultiplies the system clock obtained from the clock source 215, to generate a TMDS clock (pixel clock) corresponding to the video format and an audio clock corresponding to the audio format. Here, the relationship between the pixel clock and the audio clock (normally 128 times shorter than sampling cycles) is indicated by a CTS/N parameter.

The driver 217 sends the TMDS clock generated by the PLL circuit 216T to the clock signal line (TMDS clock channel) of the cable 300 via the data receiving unit 212. Upon receipt of a request for a transmission clock supply from the source device 100 through a CEC-line command communication, for example, the control unit 213 activates the driver 217 to transmit a TMDS clock to the source device 100.

When a TMDS clock is to be supplied to the source device 100, the control unit 113 receives a notification of the audio format of content from the source device 100 through a CEC-line command communication. The control unit 113 calculates a CTS/N parameter based on this audio format, and notifies the source device 100 of this CTS/N parameter through a CEC-line command communication, for example. Accordingly, an audio clock corresponding to the audio format based on the TMDS clock can be generated in the source device 100.

The receiver 218 receives a TMDS clock sent through the clock signal line (TMDS clock channel) of the cable 300 via the data receiving unit 212. The PLL circuit 216R demultiplies/multiplies the TMDS clock received by the receiver 218, to generate an audio clock and a system clock. When a TMDS clock is received from the source device 100, a CTS/N parameter in an ACR packet is sent from the source device 100. As a result, an audio clock can be generated from a TMDS clock in the PLL circuit 216R.

The selector switch 219a selectively extracts the system clock that is output from the clock source 215 or the system clock that is generated by the PLL circuit 216R, and sets the extracted system clock as the system clock to be used in the sink (repeater) device 200. In a case where a TMDS clock is to be sent to the source device 100, the system clock that is output from the clock source 215 is extracted. In any other cases, the system clock generated by the PLL circuit 216R is extracted.

The selector switch 219b selectively extracts the audio clock generated by the PLL circuit 216T or the audio clock generated by the PLL circuit 216R, and sets the extracted audio clock as the audio clock to be used in the sink (repeater) device 200. In a case where a TMDS clock is to be sent to the source device 100, the audio clock generated by the PLL circuit 216T is extracted. In any other cases, the audio clock generated by the PLL circuit 216R is extracted.

The selector switch 219c selectively extracts the TMDS clock generated by the PLL circuit 216T or the TMDS clock received by the receiver 218, and sets the extracted TMDS clock as the TMDS clock to be used in the sink (repeater) device 200. In a case where a TMDS clock is to be sent to the source device 100, the TMDS clock generated by the PLL circuit 216T is extracted. In any other cases, the TMDS clock received by the receiver 218 is extracted.

[Example Structures of the Data Transmitting Unit and the Data Receiving Unit]

Figure 4:
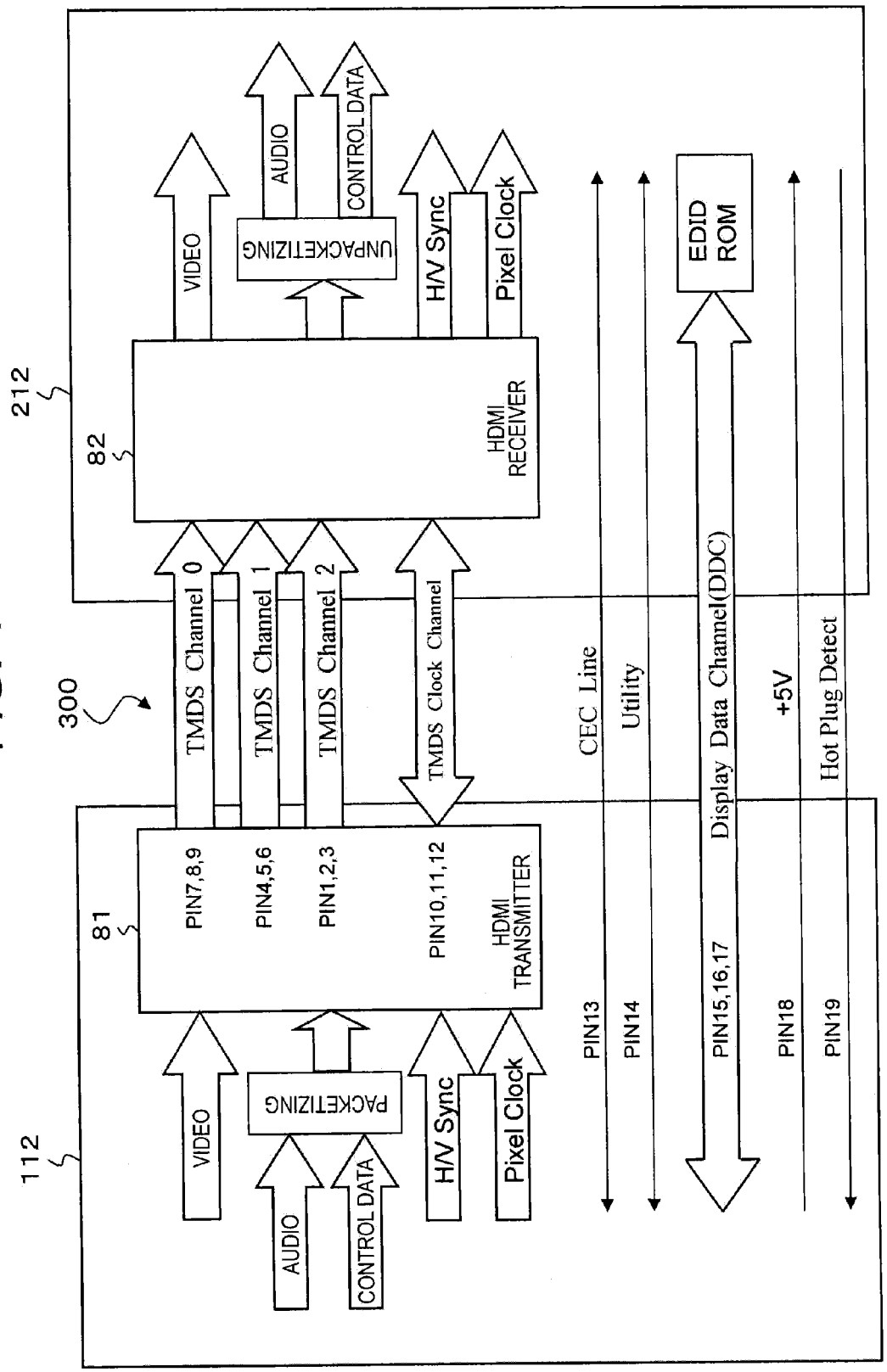
FIG. 4 is a diagram showing example structures of the data transmitting unit of the source device and the data receiving unit of the sink (repeater) device in the AV system.

FIG. 4 shows an example structure of the transmission system (the data transmitting unit 112 of the source device 100 and the data receiving unit 212 of the sink (repeater) device 200) in the AV system 10 shown in FIG. 1. In an effective image period (also referred to as an "active video period"), the data transmitting unit 112 unidirectionally transmits differential signals corresponding to uncompressed video data of a screen to the data receiving unit 212 through more than one channel.

An effective image period is a period calculated by subtracting the horizontal blanking period and the vertical blanking period from the period from one vertical synchronization signal to the next vertical synchronization signal. In a horizontal blanking period or a vertical blanking period, the data transmitting unit 112 unidirectionally transmits differential signals corresponding to at least audio data, control data, other auxiliary data, and the like accompanying video data, to the data receiving unit 212 through the channels.

In an active video period, the data receiving unit 212 receives differential signals corresponding to video data transmitted unidirectionally from the data transmitting unit 112 through the channels. In a horizontal blanking period or a vertical blanking period, the data receiving unit 212 also receives differential signals corresponding to audio data and control data transmitted unidirectionally from the data transmitting unit 112 through the channels.

The transmission channels in the transmission system formed with the data transmitting unit 112 and the data receiving unit 212 include the following channels. First of all, the transmission channels include differential signal channels (TMDS channels and a TMDS clock channel), as in an HDMI system. There are three differential signal channels for transmitting digital signals of video data and the like.

The differential signal channels are now described. As shown in FIG. 4, there are three TMDS channels #0 through #2 as the transmission channels for serially transmitting video data and audio data unidirectionally from the data transmitting unit 112 to the data receiving unit 212 in synchronization with a TMDS clock. Also, there is a TMDS clock channel as the transmission channel for transmitting a TMDS clock.

An HDMI transmitter 81 of the data transmitting unit 112 converts uncompressed video data into corresponding differential signals, for example, and then serially transmits the differential signals, through the three TMDS channels #0, #1, and #2, unidirectionally to the data receiving unit 212 connected thereto via the cable 300. The HDMI transmitter 81 also converts the audio data, necessary control data, other auxiliary data, and the like accompanying the uncompressed video data into corresponding differential signals, and transmits the differential signals unidirectionally to the data receiving unit 212 through the three TMDS channels #0, #1, and #2.

Further, the HDMI transmitter 81 transmits a TMDS clock synchronized with the video data to be transmitted through the three TMDS channels #0, #1, and #2, to the data receiving unit 212 through the TMDS clock channel, or receives the TMDS clock from the data receiving unit 212. In an HDMI system, a TMDS clock can be unidirectionally transmitted. In the transmission system of this embodiment, however, a TMDS clock can be bidirectionally transmitted. Here, through one TMDS channel #i (i=0, 1, 2), 10-bit video data is transmitted during one clock of the TMDS clock.

An HDMI receiver 82 of the data receiving unit 212 receives differential signals corresponding to video data transmitted unidirectionally from the data transmitting unit 112 through the TMDS channels #0, #1, and #2, and differential signals corresponding to audio data and control data in synchronization with a TMDS clock. This TMDS clock is a TMDS clock transmitted from the data transmitting unit 112, or a TMDS clock to be transmitted to the data transmitting unit 112.

Other than the above described TMDS channels and the TMDS clock channel, the transmission channels of the transmission system of this embodiment include transmission channels called a DDC (Display Data Channel) and a CEC line, like an HDMI system. The DDC is formed with two signal lines (not shown) included in the cable 300. The DDC is used by the data transmitting unit 112 to read E-EDID (Enhanced Extended Display Identification Data) from the data receiving unit 212.

That is, other than the HDMI receiver 82, the data receiving unit 212 includes an EDID ROM (EEPROM) that stores E-EDID that is the information about its own configuration/capability. In response to a request from the control unit 113, for example, the data transmitting unit 112 reads, through the DDC, the E-EDID from the data receiving unit 212 connected thereto via the cable 300.

The data transmitting unit 112 sends the read E-EDID to the control unit 113. The control unit 113 stores this E-EDID into a flash ROM or DRAM (not shown). Based on the E-EDID, the control unit 113 can recognize the settings of the configuration/capability of the data receiving unit 212. For example, the control unit 113 can determine whether the sink (repeater) device 200 including the data receiving unit 212 has the function of transmitting a TMDS clock (a TMDS clock supply function).

The CEC line is formed with one signal line (not shown) included in the cable 300, and is used for performing bidirectional communications of control data between the data transmitting unit 112 and the data receiving unit 212. The cable 300 also includes a line (HPD line) connected to a pin called HPD (Hot Plug Detect). The source device can use the HPD line to detect a connection with the sink device.

This HPD line is also used as a HEAC− line forming a bidirectional communication channel. The cable 300 also includes a power line (+5 V Power Line) to be used for supplying power from the source device to the sink device. The cable 300 further includes a utility line. This utility line is also used as a HEAC+ line forming a bidirectional communication channel.

Figure 5:
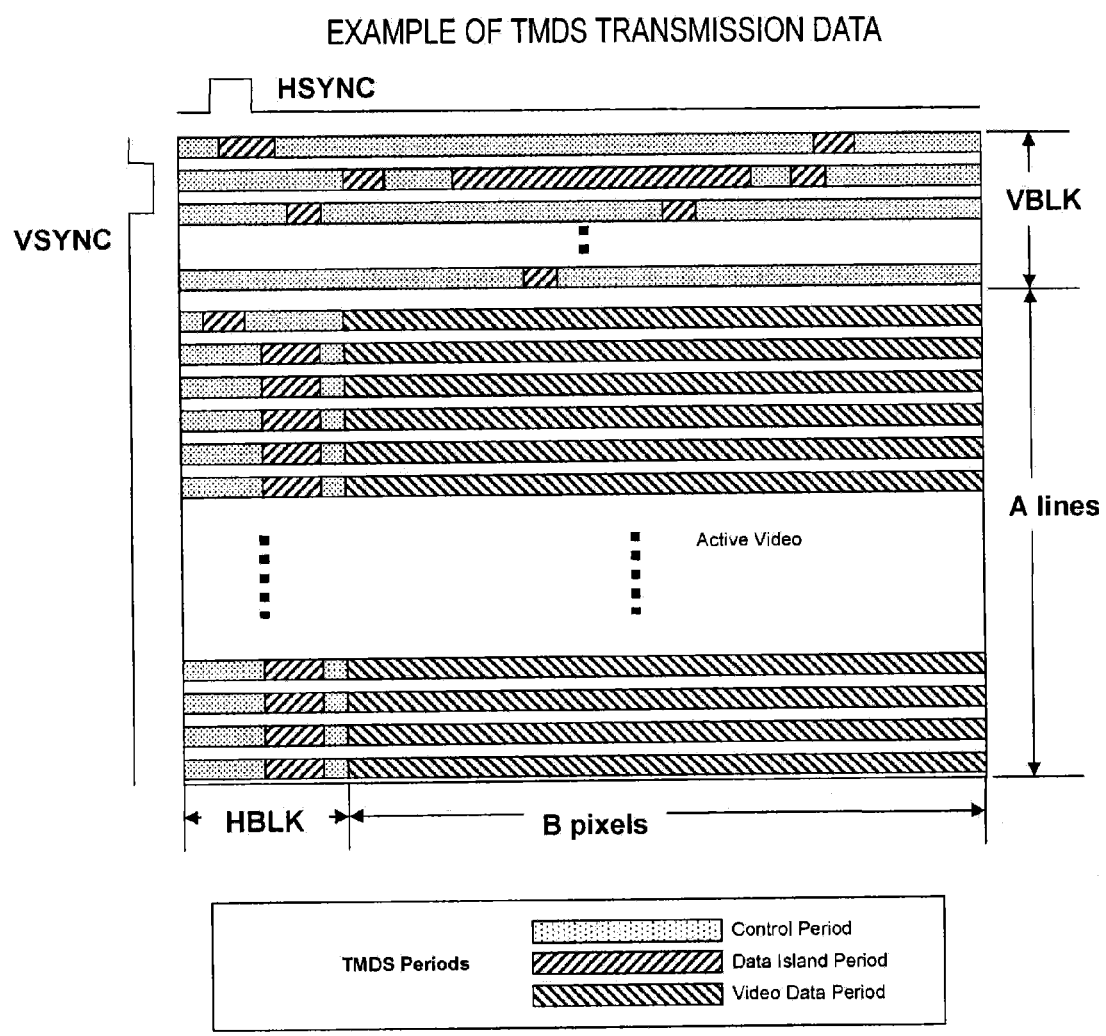
FIG. 5 is a diagram showing an example of the structure of TMDS transmission data to be transmitted through TMDS channels.

FIG. 5 shows an example structure of TMDS transmission data. FIG. 5 illustrates periods of various kinds of transmission data in a case where image data of B pixels×A lines in size is transmitted through the TMDS channels #0 through #2. In the video field in which transmission data is transmitted through the TMDS channels, three kinds of periods exist depending on transmission data types. The three kinds of periods are video data periods, data island periods, and control periods.

A video field period is a period from the active edge of a vertical synchronization signal to the active edge of the next vertical synchronization signal. The video field period is divided into horizontal blanking intervals, vertical blanking intervals, and active video periods. The video data periods that are the video field period minus the horizontal blanking intervals and the vertical blanking intervals are assigned to the active video periods. In the video data periods, data of active pixels equivalent to B pixels×A lines, which constitute uncompressed image data of one screen, is transmitted.

The data island periods and the control periods are assigned to the horizontal blanking intervals and the vertical blanking intervals. In the data island periods and the control periods, auxiliary data is transmitted. That is, the data island periods are assigned to some portions of the horizontal blanking intervals and the vertical blanking intervals. In the data island periods, data unrelated to control in the auxiliary data, such as packets of audio data and the like, are transmitted. The control periods are assigned to the other portions of the horizontal blanking intervals and the vertical blanking intervals. In the control periods, data related to control in the auxiliary data, such as vertical synchronization signals, horizontal synchronization signals, control packets, and the like, are transmitted.

Pin assignment in connector units 111 and 211 is now described. The pin assignment is the same as the pin assignment of Type-A (see FIG. 6) in an HDMI system, for example. Accordingly, an HDMI cable can be used as the cable 300.

TMDS Data #i+ and TMDS Data #i−, which are differential signals of TMDS channels #i (i=0 through 2), are transmitted through two lines that are differential lines. Pins (pins with pin numbers 7, 4, and 1) are assigned to TMDS Data #i+, and pins (pins with pin numbers 9, 6, and 3) are assigned to TMDS Data #i−. Pins with pin numbers 8, 5, and 2 are assigned to TMDS Data #i Shield (i=0 through 2).

TMDS Clock+ and TMDS Clock−, which are differential signals of the TMDS clock channel, are transmitted through two lines that are differential lines. The pin with pin number 10 is assigned to TMDS Clock+, and the pin with pin number 12 is assigned to TMDS Clock−. The pin with pin number 11 is assigned to TMDS Clock Shield.

A CEC signal that is control data is transmitted through the CEC line. The pin with pin number 13 is assigned to the CEC signal. An SDA (Serial Data) signal such as E-EDID is transmitted through an SDA line. The pin with pin number 16 is assigned to the SDA signal. An SCL (Serial Clock) signal that is the clock signal to be used for synchronization at the time of transmission/reception of the SDA signal is transmitted through an SCL line. The pin with pin number 15 is assigned to the SCL. The above described DDC line is formed with the SDA line and the SCL line.

The pin with pin number 19 is assigned to HPD/HEAC−. The pin with pin number 14 is assigned to Utility/HEAC+. The pin with pin number 17 is assigned to DDC/CEC Ground/HEAC Shield. Further, the pin with pin number 18 is assigned to the power supply (+5 V Power).

[Operations of the AV System]

Operations of the AV system 10 (the source device 100 and the sink (repeater) device 200) shown in FIG. 1 are now described. First, a case where a TMDS clock is transmitted from the source device 100 to the sink (repeater) device 200 is described. The operation in this case is the same as the operation in an HDMI system.

The operation on the source device side is now described. Each of the selector switches 120a, 120b, and 120c is connected to the t side. As a result, the system clock that is output from the clock source 116 is extracted and used at the selector switch 120a. At the selector switch 120b, the audio clock generated by the PLL circuit 117T is extracted and used. At the selector switch 120c, the TMDS clock generated by the PLL circuit 117T is extracted and used.

The driver 118 is activated. As a result, the TMDS clock generated by the PLL circuit 117T is sent out to the clock signal line (TMDS clock channel) of the cable 300 via the data transmitting unit 112, and is transmitted to the sink (repeater) device 200.

Also, the digital content data (video data and audio data) to be transmitted to the sink (repeater) device 200 is output from the video decoder 114. The video data has a predetermined format, and the above mentioned TMDS clock generated by the PLL circuit 117T corresponds to the pixel clock of this video data. The audio data also has a predetermined format, and the above mentioned audio clock generated by the PLL circuit 117T corresponds to the audio data.

The video data that is output from the video decoder 114 is supplied to and temporarily stored in the video data buffer 115V. The audio data that is output from the video decoder 114 is supplied to and temporarily stored in the audio data buffer 115A. The video data and the audio data stored in the buffers 115V and 115A are then sent out to differential signal lines (TMDS channels) of the cable 300 by the data transmitting unit 112, and are transmitted to the sink (repeater) device 200. In this case, an ACR packet is inserted into a blanking period of the video data, so that the CTS/N parameter indicating the relationship between the TMDS clock and the audio clock is transmitted to the sink (repeater) device 200.

The operation on the side of the sink (repeater) device 200 is now described. The receiver 218 is activated. As a result, the receiver 218 receives the TMDS clock sent through the clock signal line (TMDS clock channel) of the cable 300. The PLL circuit 216R then generates an audio clock and a system clock that are synchronized with the TMDS clock. In this case, the PLL circuit 216R generates an audio clock corresponding to audio data sent from the source device 100 based on the CTS/N parameter sent in an ACR packet from the source device 100.

Each of the selector switches 219a, 219b, and 219c is connected to the r side. As a result, the TMDS clock received by the receiver 218 is extracted and used at the selector switch 219c. At the selector switch 219b, the audio clock generated by the PLL circuit 216R is extracted and used. At the selector switch 219c, the system clock generated by the PLL circuit 216R is extracted and used.

The data receiving unit 212 receives video data and audio data transmitted from the source device 100 through differential signal lines (TMDS channels) of the cable 300. The received video data is temporarily stored in the video data buffer 214V. The received audio data is temporarily stored in the audio data buffer 214A.

The video data stored in the video data buffer 214V is then read out in synchronization with the TMDS clock, is subjected to predetermined processing by an image processing circuit based on the system clock (internal clock), and is displayed as an image on a display (an image display device). The audio data stored in the audio data buffer 214A is read out in synchronization with the audio clock, is subjected to a predetermined processing by an audio DSP (Digital Signal Processor) based on the system clock (internal clock), and is output as the sound corresponding to the displayed image from a speaker, for example.

Next, a case where a TMDS clock is transmitted from the sink (repeater) device 200 to the source device 100 is described. In this case, a request for TMDS clock transmission (supply) is issued from the source device 100 to the sink (repeater) device 200, and a TMDS clock is transmitted from the sink (repeater) device 200 to the source device 100.

In this case, the source device 100 notifies the sink (repeater) device 200 of the video format of the content. Based on the notification, the sink (repeater) device 200 determines a transmission video format. The sink (repeater) device 200 then notifies the source device 100 of the determined transmission video format. As described above, the TMDS clock to be transmitted from the sink (repeater) device 200 to the source device 100 corresponds to the transmission video format of which the source device 100 is notified.

In this case, the source device 100 also notifies the sink (repeater) device 200 of the audio format of the content. Based on the notification, the sink (repeater) device 200 determines the CTS/N parameter corresponding to the TMDS clock to be transmitted from the sink (repeater) device 200 to the source device 100 as described above and the above mentioned audio format. The sink (repeater) device 200 then notifies the source device 100 of the determined CTS/N parameter.

The operation on the source device side is now described. The receiver 119 is activated. As a result, the receiver 119 receives the TMDS clock sent through the clock signal line (TMDS clock channel) of the cable 300. The PLL circuit 117R then generates an audio clock and a system clock that are synchronized with the TMDS clock. In this case, the PLL circuit 117R generates the audio clock corresponding to the audio data output from the video decoder 114 based on the CTS/N parameter sent from the sink (repeater) device 200 as described above.

Each of the selector switches 120a, 120b, and 120c is connected to the r side. As a result, the system clock generated by the PLL circuit 117R is extracted and used at the selector switch 120a. At the selector switch 120b, the audio clock generated by the PLL circuit 117R is extracted and used. At the selector switch 120c, the TMDS clock received by the receiver 119 is extracted and used.

Also, the digital content data (video data and audio data) to be transmitted to the sink (repeater) device 200 is output from the video decoder 114. In this case, the format of the video data is the transmission video format sent in a notification from the sink (repeater) device 200 as described above. The above mentioned TMDS clock received by the receiver 119 corresponds to the pixel clock of the video data. The audio data also has a predetermined format, and the above mentioned audio clock generated by the PLL circuit 117R corresponds to the audio data.

The video data that is output from the video decoder 114 is supplied to and temporarily stored in the video data buffer 115V. The audio data that is output from the video decoder 114 is supplied to and temporarily stored in the audio data buffer 115A. The video data and the audio data stored in the buffers 115V and 115A are then sent out to differential signal lines (TMDS channels) of the cable 300 by the data transmitting unit 112, and are transmitted to the sink (repeater) device 200.

As described above, in the source device 100, a TMDS clock sent from the sink (repeater) device 200, and an audio clock and a system clock generated based on the TMDS clock are used. As a result, content data (video data and audio data) to be transmitted from the data transmitting unit 112 of the source device 100 to the sink (repeater) device 200 is synchronized with the TMDS clock sent from the sink (repeater) device 200.

The operation on the side of the sink (repeater) device 200 is now described. Each of the selector switches 219a, 219b, and 219c is connected to the t side. As a result, the system clock that is output from the clock source 215 is extracted and used at the selector switch 219a. At the selector switch 219b, the audio clock generated by the PLL circuit 216T is extracted and used. At the selector switch 219c, the TMDS clock generated by the PLL circuit 216T is extracted and used.

The driver 217 is activated. As a result, the TMDS clock generated by the PLL circuit 216T is sent out to the clock signal line (TMDS clock channel) of the cable 300 via the data receiving unit 212, and is transmitted to the source device 100.

The data receiving unit 212 receives video data and audio data transmitted from the source device 100 through differential signal lines (TMDS channels) of the cable 300. The received video data is temporarily stored in the video data buffer 214V. The received audio data is temporarily stored in the audio data buffer 214A.

The video data stored in the video data buffer 214V is then read out in synchronization with the TMDS clock, is subjected to predetermined processing by the image processing circuit based on the system clock (internal clock), and is displayed as an image on the display (the image display device). The audio data stored in the audio data buffer 214A is read out in synchronization with the audio clock, is subjected to a predetermined processing by the audio DSP (Digital Signal Processor) based on the system clock (internal clock), and is output as the sound corresponding to the displayed image from the speaker, for example.

As described above, when a TMDS clock is supplied from the sink (repeater) device 200 to the source device 100, a system clock is generated based on the TMDS clock in the source device 100. Also, in the source device 100, a CTS/N parameter received from the sink (repeater) device 200 is used to generate the audio clock of the own device.

Those clocks are synchronized with the high-quality TMDS clock generated by the clock source in the sink (repeater) device 200, and accordingly, are generated perfectly in synchronization with the system clock of the sink (repeater) device 200 while maintaining high quality. In the source device 100, data for transmission (video data and audio data) are generated in synchronization with the TMDS clock or a system clock and an audio clock obtained by demultiplying/multiplying the TMDS clock, and are then transmitted. At this point, the transmission video format is a transmission video format determined in the sink (repeater) device 200.

As described above, content data (video data and audio data) to be transmitted from the source device 100 to the sink (repeater) device 200 is synchronized with the TMDS clock supplied from the sink (repeater) device 200 to the source device 100. As a result, the video data and the audio data received by the data receiving unit 212 in the sink (repeater) device 200 is synchronized with the system clock of its own device. Accordingly, the sink (repeater) device 200 can perform reproduction by using its own internal clock. This internal clock is a high-quality clock generated from the high-quality clock source 215 existing in the sink (repeater) device 200, and accordingly, the reproduced image/sound also has high quality.

Figure 7:
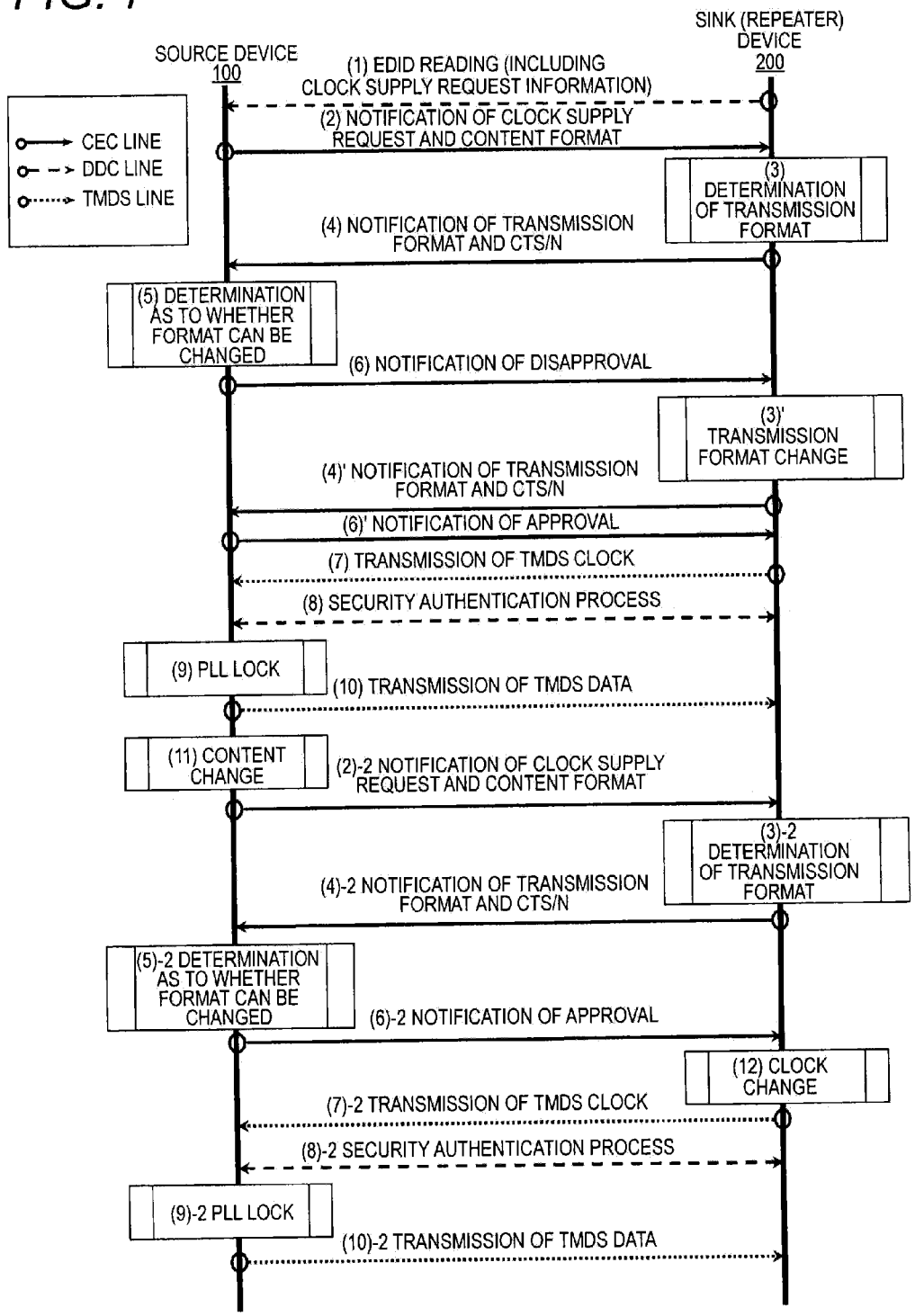
FIG. 7 is a sequence diagram schematically showing the procedures to be carried out by the respective devices in a case where the source device receives a supply of a TMDS clock from the sink (repeater) device.

The sequence diagram in FIG. 7 schematically shows the procedures to be carried out by the respective devices in a case where the source device 100 receives a supply of a TMDS clock from the sink (repeater) device 200.

(1) In a +5 V Power/HPD process (not shown) compliant with the existing HDMI Specification, a connection between the source device 100 and the sink (repeater) device 200 is sensed. The source device 100 then reads, through the DDC line, the EDID that indicates the configuration/capability of the sink (repeater) device 200 and is stored in a NVM (nonvolatile memory) or the like in the sink (repeater) device 200, and checks the clock supply capability of the sink (repeater) device 200.

The sink (repeater) device 200 according to the present technique has a clock supply capability indicated in the EDID stored therein, and uses at least one bit to express information indicating that a clock is to be supplied if allowed by the source device 100 (clock supply request information). Therefore, through the process in which the source device 100 reads the EDID, the sink (repeater) device 200 notifies the source device 100 of the clock supply request information.

(2) When the source device 100 which read the EDID understands the clock supply request information in the EDID, or when an extension of the present technique is implemented in the source device 100, the source device 100 notifies, through the CEC line, the sink (repeater) device 200 of a clock supply request and the video and audio formats of the content to be reproduced. An example of the command in that case is as follows.
<Request_Reverse_TMDS_Clock>[Video format] [Audio format]

(3) Upon receipt of the command, the sink (repeater) device 200 determines a transmission format by taking into account the formats of the content and its own clock capability.

(4) The sink (repeater) device 200 then notifies the source device 100 of the determined format and the CTS/N parameter for audio clock generation through the CEC line. An example of the command in that case is as follows.
<Inquire_Transmission_Format>[Video format] [Audio format] [CTS] [N]

(5) Upon receipt of the transmission format notification command from the sink (repeater) device 200, the source device 100 compares its own transmission capacity with the received contents, and determines whether it is possible to respond to the request from the sink (repeater) device 200. (6) If unable to respond to the request, the source device 100 notifies the sink (repeater) device 200 to that effect, and requests a change to an alternative format. The command that is actually issued in this case is the existing <Feature Abort> [Refused], for example.

(3') Upon receipt of the response to the effect that the source device 100 cannot respond to the request, the sink (repeater) device 200 changes the transmission format to another one compatible with its own device. (4') The sink (repeater) device 200 then notifies the source device 100 of the information about the changed format. (6') If the source device 100 can perform transmission in the format designated by the sink (repeater) device 200, the sink (repeater) device 200 is notified to that effect. (7) After that, the sink (repeater) device 200 receives a command, and starts sending out a TMDS clock to the TMDS clock channel. (8) As transmission can be performed between the source device 100 and the sink (repeater) device 200, an exchange of authentication data for content protection may be started through the DDC line at the same time, if necessary.

(9) After the source device 100 receives the TMDS clock from the sink (repeater) device 200, the PLL circuit 117R is locked with the received TMDS clock. (10) The source device 100 then sends out TMDS data to the TMDS channels #0, #1, and #2 in synchronization with the TMDS clock. The sink (repeater) device 200 can reproduce the transmitted data in synchronization with its own clock.

(11) Although not described in detail herein, the above described process is repeated to perform transmission when the content is changed.

[Example of a Transmission Format Determination]

An example of a transmission format determination in the sink (repeater) device 200 is now described. In this description, the resolution of the sink device 200 is 1920×1080 pixels, and the frame rate is 60 Hz progressive. To realize the above described application illustrated in FIG. 11, the sink device 200 receives outputs of four connected source devices 100.

The format (resolution) of the content to be reproduced by each of the source devices 100 is as follows, for example. Each of the source devices 100 notifies the sink device 200 of the format (resolution) of the content in the process (2) in FIG. 7.

Source 1: 1920×1080/60 Hz progressive
Source 2: 1920×1080/24 Hz progressive
Source 3: 1920×1080/60 Hz interlace
Source 4: 480×270/60 Hz progressive In the process (4) in FIG. 7, the sink device 200 requests each of the four source devices 100 to perform conversion to ¼ of its own resolution, or a resolution of 480×270 pixels/60 Hz progressive, and then perform transmission.

In response to the request from the sink device 200, the source devices other than "Source 4" need to perform the format conversion. Here, "Source 1" and "Source 2" can perform the conversion to the requested format, and "Source 1", "Source 2", and "Source 4" each sends a "notification of approval" in the process (6') in FIG. 7. However, "Source 3" cannot perform the conversion to the requested format, and sends a "notification of disapproval" in the process (6) in FIG. 7.

Based on the "notification of disapproval" from "Source 3", the sink device 200 again determines the next candidate in accordance with its own format conversion capability in the process (3') in FIG. 7. For example, after performing interlace-progressive conversion, the sink device 200 requests "Source 3" to perform transmission at a resolution of 480× 270 pixels/60 Hz interlace in the process (4') in FIG. 7. Upon receipt of the request, "Source 3" can respond to the request simply by downsampling pixels. Accordingly, a "notification of approval" is sent to the sink device 200 in the process (6') in FIG. 7.

At this point, the TMDS clock to be supplied from the sink device 200 to "Source 1", "Source 2", and "Source 4" differs from the TMDS clock to be supplied to "Source 3". The sink device 200 demultiplies the TMDS clock to be supplied to the other source devices 100 by ½, and then supplies the demultiplied TMDS clock to "Source 3". It is of course possible to repeat the communication with all the source devices 100 until the format for which all the source devices 100 can send a "notification of approval" is found, so as to supply the same TMDS clocks to all the source devices.

As described above, in the AV system 10 shown in FIG. 1, a TMDS clock is supplied from the sink (repeater) device 200 to the source device 100 via the TMDS clock channel (the clock signal line). The source device 100 then transmits content data (video data and audio data) to the sink (repeater) device 200 via TMDS channels (differential signal lines) in synchronization with the TMDS clock supplied from the sink (repeater) device 200. Accordingly, high-quality content reproduction can be performed in the sink (repeater) device 200, without the use of an additional line such as an HEAC line.

Also, in the AV system 10 shown in FIG. 1, the source device 100 is designed to notify the sink (repeater) device 200 of the video format of the content to be reproduced and receive a transmission video format notification from the sink (repeater) device 200. The source device 100 then transmits video data in the transmission video format designated in the notification from the sink (repeater) device 200, to the sink (repeater) device 200. Accordingly, the load of format conversion on the sink (repeater) device 200 can be greatly reduced, and the sink (repeater) device 200 can easily realize an application to simultaneously display content supplied from more than one source device 100 (see FIG. 11), for example.

In this case, the sink devices 100 notify the source device 200 of transmission formats, and the clocks (TMDS clocks) are transmitted, so that the respective source devices 100 output synchronized video data in the same video format. Accordingly, the sink device 200 can realize the application without any large buffer and without the need to perform any particular format conversion.

However, the times to start transmitting frames might vary, and therefore, a frame buffer equivalent to one frame at a maximum might be necessary to establish frame synchronization. Still, all the data to be transmitted from the respective source devices 100 are synchronized, and accordingly, there is no possibility that a buffer overflow/underflow will occur.

Also, in the AV system 10 shown in FIG. 1, a TMDS clock is supplied from the sink (repeater) device 200 to the source device 100 via the TMDS clock channel (the clock signal line) Since any additional line such as an HEAC line is not used, an application to convert HDMI signals into signals compliant to other standards or convert signals compliant to other standards into HDMI signals can be realized.

2. Modifications

In the above described embodiment, the sink (repeater) device 200 supplies a TMDS clock synchronized with the internal clock source 215 to the source device 100. However, an external clock source may be used as a clock source.

Figure 8:
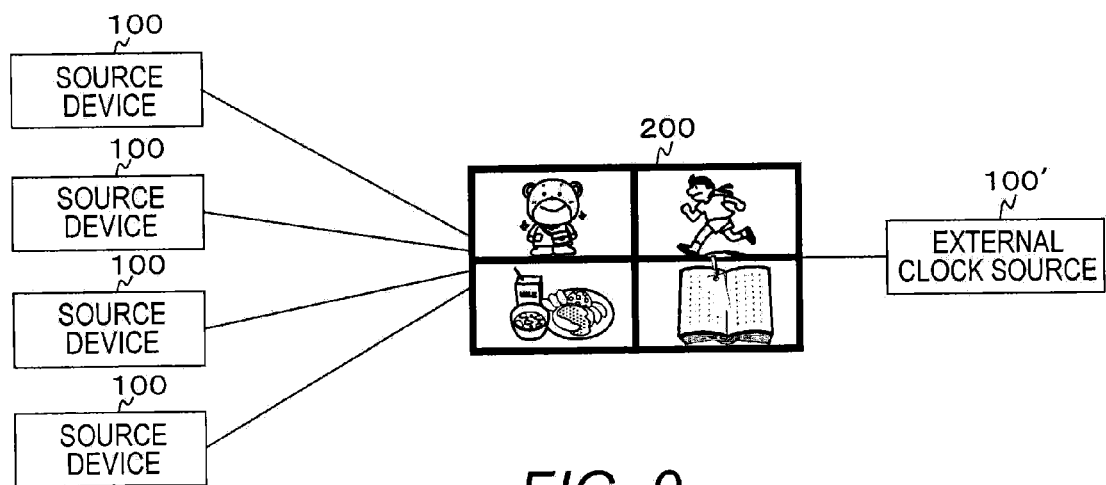
FIG. 8 is a diagram showing an application to simultaneously display content supplied from four source devices using an external clock source.
Figure 11:
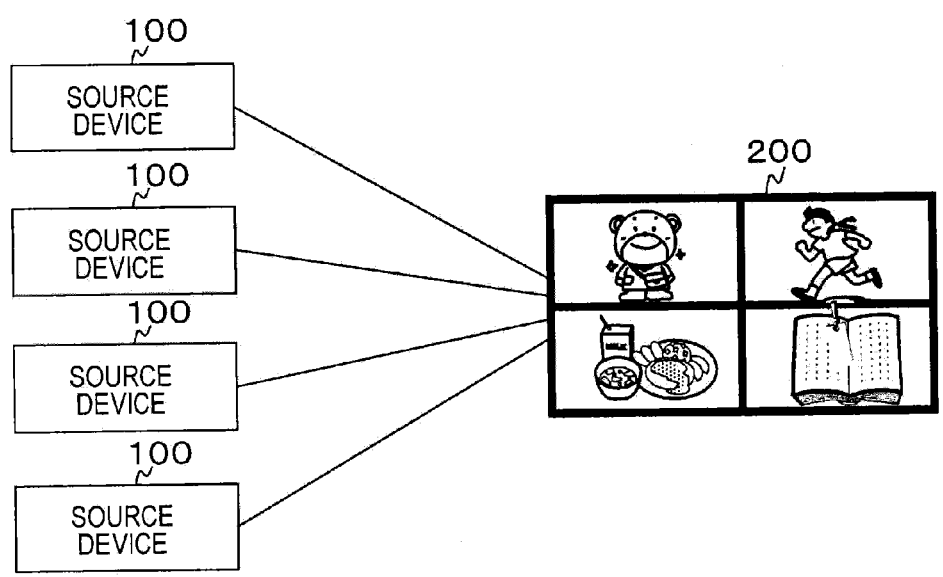
FIG. 11 is a diagram showing an application to simultaneously display content supplied from four source devices.

FIG. 8 shows an application to simultaneously display content supplied from more than one source device 100, like the above described example application shown in FIG. 11. This application is to connect four source devices 100 to one sink device 200, and display content supplied from the four source devices 100 on the one sink device 200.

In this case, a TMDS clock supplied from a source device 100' connected as an external clock source is further supplied from the sink device 200 to the respective connected source devices 100. With this configuration, it is also possible to realize an application that enables simultaneous viewing of content supplied from more than one source device by virtue of high-quality reproduction using a high-quality clock.

Figure 9:
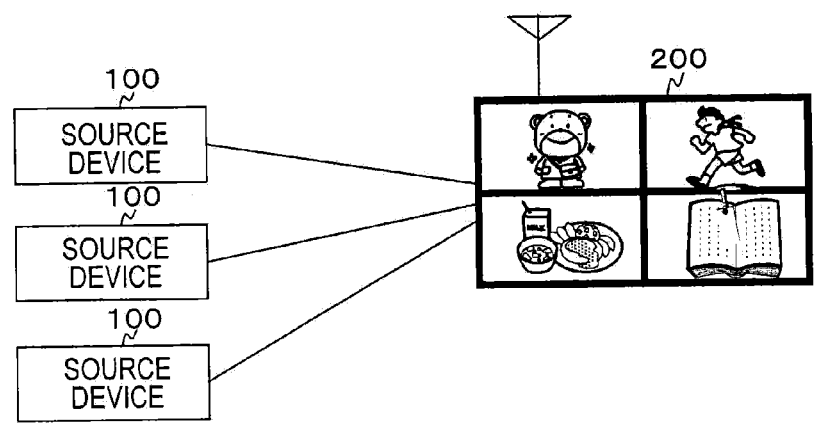
FIG. 9 is a diagram showing an application to simultaneously display content supplied from three source devices and broadcast content.
Figure 10:
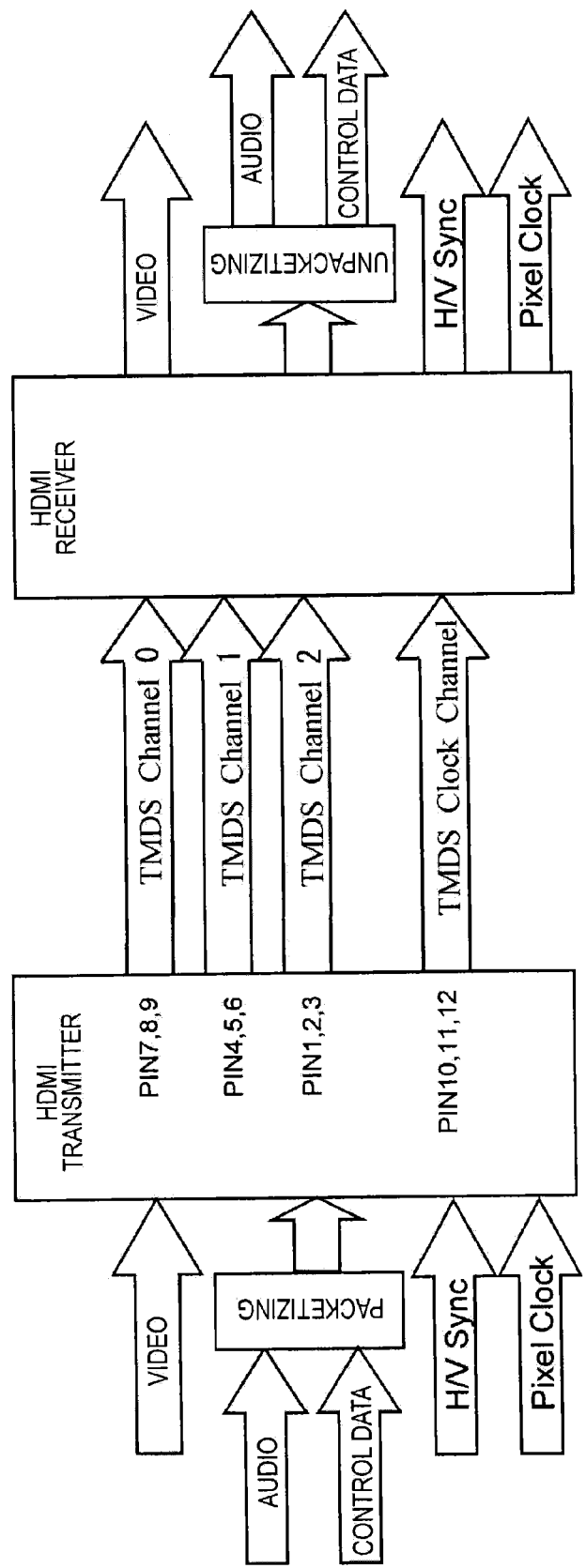
FIG. 10 is a diagram showing an outline of specifications according to the existing HDMI Specification.

The above described example application shown in FIG. 8 is an example application to enable simultaneous viewing of content supplied from four source devices 100. As shown in FIG. 9, with the same configuration as above, it is also possible to simultaneously view broadcast content supplied from three source devices 100 and broadcast content received by a broadcast wave tuner (not shown) installed in the sink device 200, for example.

In this case, video content of the three source devices 100 is simultaneously displayed on three regions that are three fourths of a screen, and broadcast content is downsampled to a ¼ size and is displayed on the remaining region. It is obvious that such an application is not limited to quartering display, and can be applied to double-screen display and the like.

Although not described above, a CEC command or the like may be sent to the clock source of its own device to inquire whether the clock source is the clock source of the entire system. By doing so, the viewer can determine which device serves as the clock source of the system. For example, the clock source of the system can be determined to be an external clock source in the case illustrated in FIG. 8, and can be determined to the sink device 200 in the case illustrated in FIG. 11.

In the above described embodiment, there are three TMDS channels (differential signal lines). However, it is of course possible to apply the present technique in cases where the number of TMDS channels (differential signal lines) is not three.

Also, in the above described embodiment, the present technique is applied to an AV system in which a source device and a sink (repeater) device are connected by a digital interface substantially compliant with the HDMI Specification, except for TMDS clock transmission. The present technique is not limited to that, and can of course be applied to an AV system in which devices are connected by a digital (wireless or cable) interface compliant to other similar standards. Therefore, the number of TMDS channels (differential signal lines) may not be three.

The present technique may also be embodied in the structures described below.

(1) A transmission device including:
a transmission clock receiving unit that receives a transmission clock from an external device via a clock signal line; and
a data transmitting unit that transmits content data to the external device via a predetermined number of differential signal lines in synchronization with the transmission clock received by the transmission clock receiving unit.

(2) The transmission device of (1), further including:
a function determining unit that determines whether the external device has the function of transmitting the transmission clock; and
a transmission clock requesting unit that requests the external device to transmit the transmission clock when the external device is determined to have the function of transmitting the transmission clock.

(3) The transmission device of (1) or (2), further including
a communication unit that notifies the external device of the video format of the content, and receives a notification of a transmission video format from the external device,
wherein the data transmitting unit transmits the content data in the transmission video format designated in the notification from the external device to the external device.

(4) The transmission device of (3), wherein
the communication unit further notifies the external device of the audio format of the content, and further receives a notification of a parameter indicating the relationship between a transmission clock and an audio clock from the external device, and
the transmission device further includes an audio clock generating unit that generates an audio clock based on the transmission clock received by the transmission clock receiving unit and the parameter.

(5) The transmission device of any of (1) through (5), further including:
a clock source that obtains a system clock;
a transmission clock generating unit that generates a transmission clock by demultiplying the system clock obtained by the clock source; and
a transmission clock transmitting unit that transmits the transmission clock generated by the transmission clock generating unit to the external device via the clock signal line,
wherein,
when the transmission clock transmitting unit transmits the transmission clock to the external device, the data transmitting unit transmits the content data to the external device in synchronization with the transmitted transmission clock, and,
when the transmission clock receiving unit receives the transmission clock from the external device, the data transmitting unit transmits the content data to the external device in synchronization with the received transmission clock.

(6) A transmission method including:
a transmission clock receiving step of receiving a transmission clock from an external device via a clock signal line; and
a data transmitting step of transmitting content data to the external device via a predetermined number of differential signal lines in synchronization with the transmission clock received in the transmission clock receiving step.

(7) A reception device including:
a data receiving unit that receives content data from an external device via a predetermined number of differential signal lines;
a data processing unit that processes the content data based on a system clock; and
a transmission clock transmitting unit that transmits a transmission clock synchronized with the system clock to the external device via a clock signal line.

(8) The reception device of (7), wherein the transmission clock transmitting unit transmits the transmission clock to the external device when there is a transmission request for a transmission clock from the external device.

(9) The reception device of (7) or (8), further including
a notifying unit that receives the video format of the content from the external device, and notifies the external device of a transmission video format.

(10) The reception device of (9), wherein the notifying unit further receives a notification of the audio format of the content from the external device, and further notifies the external device of a parameter indicating the relationship between a transmission clock and an audio clock, the parameter being calculated based on the audio format.

(11) The reception device of any of (7) through (10), further including:
a transmission clock receiving unit that receives a transmission clock from the external device via the clock signal line; and
a system clock generating unit that generates a system clock based on the transmission clock received by the transmission clock receiving unit,
wherein, when the transmission clock receiving unit receives the transmission clock from the external device, the data processing unit performs the processing based on the system clock generated by the system clock generating unit.

(12) The reception device of any of (7) through (11), further including:
a clock source that obtains the system clock; and
a transmission clock generating unit that generates the transmission clock by using the system clock obtained by the clock source.

(13) The reception device of any of (7) through (11), further including
a transmission clock receiving unit that receives the transmission clock from another external device,
wherein the transmission clock transmitting unit transmits the transmission clock received by the transmission clock receiving unit.

(14) A reception method including:
a data receiving step of receiving content data from an external device via a predetermined number of differential signal lines;
a data processing step of processing the content data based on a system clock; and
a transmission clock transmitting step of transmitting a transmission clock synchronized with the system clock to the external device via a clock signal line.

(15) A transmission/reception system including a transmission device and a reception device connected to each other via a transmission channel,
the transmission device including:
a transmission clock receiving unit that receives a transmission clock from the reception device via a clock signal line; and
a data transmitting unit that transmits content data to the reception device via a predetermined number of differential signal lines in synchronization with the transmission clock received by the transmission clock receiving unit,
the reception device including:
a data receiving unit that receives the content data from the transmission device via the predetermined number of differential signal lines;
a data processing unit that processes the content data received by the data receiving unit based on a system clock; and
a transmission clock transmitting unit that transmits a transmission clock synchronized with the system clock to the transmission device via the clock signal line.

REFERENCE SIGNS LIST

10 AV system
81 Transmitter
82 Receiver
100 Source device
111 Connector unit
112 Data transmitting unit
113 Control unit
114 Video decoder
115V Video data buffer
115A Audio data buffer
116 Clock source
117R, 117T PLL circuit
118 Driver
119 Receiver
120a, 120b, 120c Switch
219a, 219b, 219c Switch
200 Sink (repeater) device
211 Connector unit
212 Data receiving unit
213 Control unit
214V Video data buffer
214A Audio data buffer
215 Clock source
216R, 216T PLL circuit
217 Driver
218 Receiver
300 Cable

The invention claimed is:
1. A transmission device comprising:
a transmission clock receiving circuit that receives a transmission clock from an external device via a differential clock signal line;
a synchronization circuit that synchronizes content data with the received transmission clock to generate synchronized content data; and
a data transmitting circuit that transmits the synchronized content data to the external device via a predetermined number of differential signal lines.
2. The transmission device according to claim 1, further comprising:
a function determining circuit that determines whether the external device has a function of transmitting the transmission clock; and a transmission clock requesting circuit that transmits a transmission request to the external device to transmit the transmission clock when the external device is determined to have the function of transmitting the transmission clock.

3. The transmission device according to claim 1, further comprising:
a communication circuit that notifies the external device of a video format of the content data, and receives a notification of a transmission video format from the external device, wherein
the synchronizing circuit synchronizes the content data with the received transmission clock and the transmission video format designated in the notification from the external device.

4. The transmission device according to claim 3, wherein
the communication circuit further notifies the external device of an audio format of the content data, and further receives a notification, from the external device, of a parameter indicating a relationship between the transmission clock and a first audio clock of the external device, and
the transmission device further comprises an audio clock generating circuit that generates a second audio clock based on the transmission clock received by the transmission clock receiving circuit and the parameter.

5. The transmission device according to claim 1, further comprising:
a clock source that obtains a system clock;
a transmission clock generating circuit that generates another transmission clock by demultiplying the system clock obtained by the clock source; and
a transmission clock transmitting circuit that transmits the another transmission clock generated by the transmission clock generating circuit to the external device via the differential clock signal line, wherein
when the transmission clock transmitting circuit transmits the another transmission clock to the external device, the synchronization circuit synchronizes the content data with the transmitted another transmission clock to generate transmission synchronized content data, and the data transmitting circuit transmits the transmission synchronized content data to the external device, and
when the transmission clock receiving circuit receives the transmission clock from the external device, the data transmitting circuit transmits the synchronized content data to the external device.

6. A transmission method comprising:
receiving, by a transmission clock receiving circuit, a transmission clock from an external device via a differential clock signal line;
synchronizing, by a synchronization circuitry, content data with the received transmission clock to generate synchronized content data; and
transmitting, by a data transmission circuit, the synchronized content data to the external device via a predetermined number of differential signal lines.

7. A reception device comprising:
a transmission clock transmitting circuit that transmits a transmission clock to an external device via a differential clock signal line, the transmission clock synchronized with a system clock;
a data receiving circuit that receives content data from the external device via a predetermined number of differential signal lines, the content data synchronized with the transmission clock transmitted to the external device; and a data processing circuit that processes the content data based on the system clock.

8. The reception device according to claim 7, wherein
the transmission clock transmitting circuit transmits the transmission clock to the external device when the reception device receives a transmission request for the transmission clock from the external device.

9. The reception device according to claim 7, further comprising:
a notifying circuit that receives a notification, from the external device, of a video format of the content data, and transmits a second notification, to the external device, of a transmission video format.

10. The reception device according to claim 9, wherein the notifying circuit further
receives a notification of an audio format of the content data from the external device, and
notifies the external device of a parameter indicating a relationship between the transmission clock and an audio clock of the reception device, the parameter being calculated based on the audio format.

11. The reception device according to claim 7, further comprising:
a transmission clock receiving circuit that receives another transmission clock from the external device via the differential clock signal line; and
a system clock generating circuit that generates the system clock based on the another transmission clock received by the transmission clock receiving circuit, wherein
when the transmission clock receiving circuit receives the another transmission clock from the external device, the data processing circuit performs the processing based on the system clock generated by the system clock generating circuit.

12. The reception device according to claim 7, further comprising:
a clock source configured to obtain the system clock; and
a transmission clock generating circuit that generates the transmission clock by using the system clock obtained by the clock source.

13. The reception device according to claim 7, further comprising:
a transmission clock receiving circuit that receives another transmission clock from another external device, wherein
the transmission clock transmitting circuit transmits the another transmission clock received by the transmission clock receiving circuit.

14. A reception method comprising:
transmitting, by a transmitting circuit, a transmission clock to an external device via a differential clock signal line, the transmission clock synchronized with a system clock;
receiving, by a data receiving circuit, content data from the external device via a predetermined number of differential signal lines, the content data synchronized with the transmission clock transmitted to the external device; and
processing, by a data processing circuit, the content data based on the system clock.

15. A transmission and reception system comprising:
a transmission device; and
a reception device that is connected to the transmission device via a transmission channel,
the transmission device comprising:

a transmission clock receiving circuit that receives a transmission clock from the reception device via a differential clock signal line;

a synchronization circuit that synchronizes content data with the received transmission clock to generate synchronized content data; and a data transmitting circuit that transmits the synchronized content data to the reception device via a predetermined number of differential signal lines, the reception device comprising:
a transmission clock transmitting circuit that transmits the transmission clock to the transmission clock via the differential clock signal line, the transmission clock synchronized with a system clock of the reception device;

a data receiving circuit that receives the synchronized content data from the transmission device via the predetermined number of differential signal lines; and a data processing circuit that processes the synchronized content data based on the system clock.

16. The transmission device according to claim 1, further comprising:
an authentication data reception circuit that receives authentication data from the external device; and
an authentication processing circuit that processes the authentication data.

17. The transmission device according to claim 1, wherein the data transmitting circuit transmits the synchronized content data to the external device via transition minimized differential signaling (TMDS).

18. The transmission device according to claim 17, wherein the transmission clock is a TMDS clock.

19. The transmission device according to claim 1, wherein the external device is a repeater device.

20. The reception device according to claim 7, wherein the data receiving circuit receives the content data from the external device via transition minimized differential signaling (TMDS).

* * * * *